UNITED STATES PATENT OFFICE.

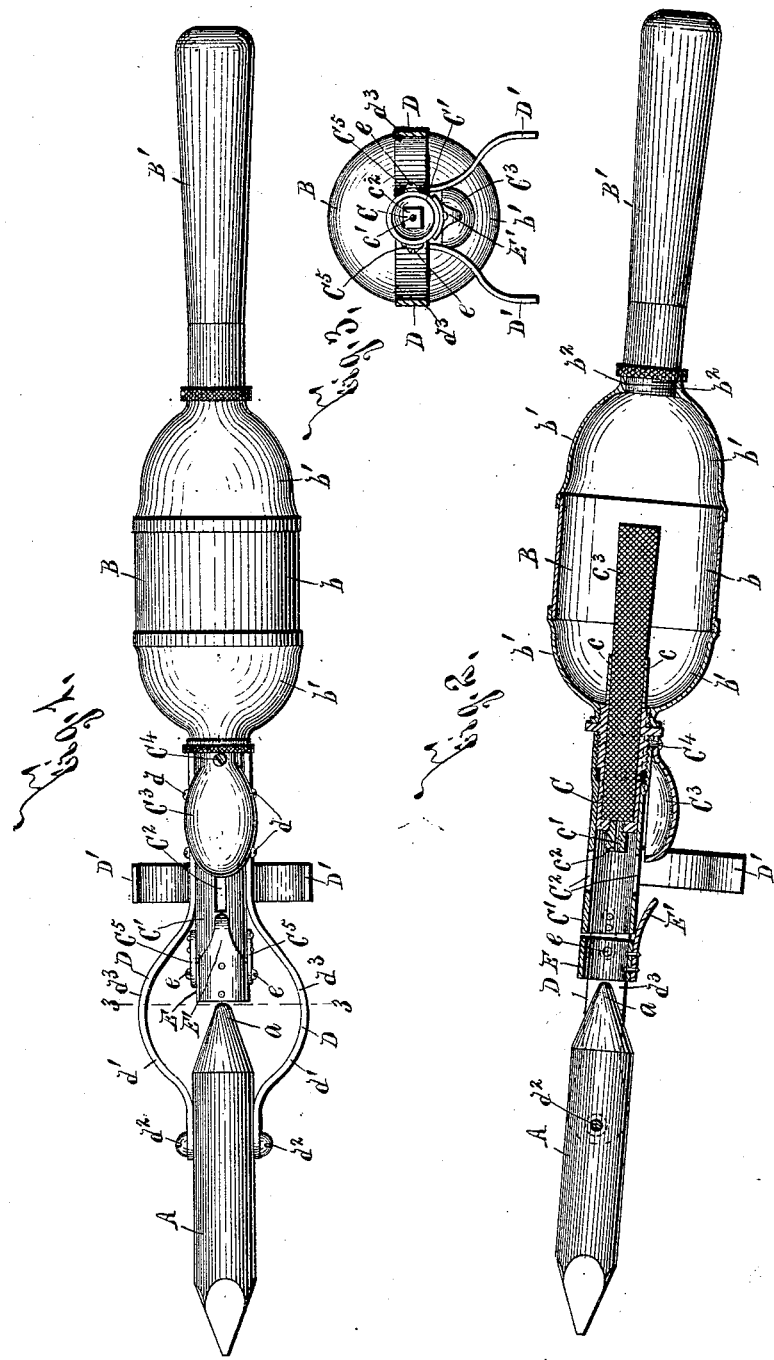

DAVID G. ORR AND CLIFFORD E. THOMAS, OF SYRACUSE, NEW YORK.

SOLDERING-TOOL.

SPECIFICATION forming part of Letters Patent No. 520,701, dated May 29, 1894.

Application filed July 26, 1893. Serial No. 481,482. (No model.)

*To all whom it may concern:*

Be it known that we, DAVID G. ORR and CLIFFORD E. THOMAS, of Syracuse, in the county of Onondaga, in the State of New York, have invented new and useful Improvements in Soldering-Tools, of which the following, taken in connection with the accompanying drawings, is a full, clear, and exact description.

Our invention relates to improvements in soldering tools, and has for its object the production of a simple and practical device, which is economically manufactured, is durable and effective in use, and is so constructed that the soldering bolt is constantly maintained at the required temperature without necessitating the use of an ordinary furnace for effecting this result; and to this end it consists, essentially, in a soldering bolt, a fuel reservoir provided at one end with a handle and at the other with a projecting burner secured thereto and having its outer end separated from the adjacent end of the soldering bolt, and a frame secured to the fuel reservoir and hinged to the soldering bolt.

The invention furthermore consists in a regulator for governing the temperature of the soldering bolt and in the detail construction and arrangement of the parts, all as hereinafter more particularly described and pointed out in the claims.

In describing this invention, reference is had to the accompanying drawings, forming a part of this specification, in which like letters indicate corresponding parts in all the views.

Figure 1 is an inverted plan view, and Fig. 2 an elevation, partly in section, of our improved soldering tool, illustrating the general construction and arrangement of its component parts, and Fig. 3 is a transverse sectional view, taken on line 3—3—, Fig. 1.

Our improved soldering tool consists of a soldering bolt A, a fuel reservoir B provided with a burner C secured to the fuel reservoir and projecting toward the soldering bolt, a frame D connecting the fuel reservoir and soldering bolt, and a regulator E for governing the temparature of the soldering bolt.

A represents the soldering bolt, which is of any desired form, size, and construction, and is preferably formed with a pointed or tapering inner end $a$.

B is the reservoir formed with rounded contracted ends and consisting of sections $b$ $b'$ $b'$. As clearly seen at Fig. 2, the reservoir B is provided at its outer end with an inlet opening $b^2$ closed by the adjacent end of a handle B' secured to said reservoir B and formed of suitable material as wood.

The burner C of our soldering tool is arranged substantially parallel with the normal lengthwise plane of the soldering bolt, and consists of a hollow nipple having one end rigidly secured to the reservoir B and provided with a nipple $c$ extending within the reservoir and having its other end separated from the adjacent pointed end $a$ of the soldering bolt A and provided with an outlet opening $c'$. This burner C is preferably removably secured within an opening in the end of the reservoir B opposite to that provided with the opening $b^2$, and is formed with an outlet tip $c^2$. Within the burner C is one end of a wick $c^3$ having its other end extending within the reservoir H.

C' is a burner tube arranged substantially parallel with the normal lengthwise plane of the soldering bolt, and formed of less diameter than the reservoir B and having one end surrounding and removably secured to the burner or nipple C and the other end projecting outwardly beyond the tip $c^2$. This burner tube, although secured directly to the burner C, is essentially secured to the reservoir B, as the burner C is fixed to said reservoir, and is provided at its outer end with air inlets $C^2$. Directly beneath the end of the tube C' encircling the burner C is a cup $C^3$ removably secured by suitable fastening means $C^4$ to the burner C.

The reservoir B is filled with gasoline or similar fuel, a small portion of said fuel is inserted within the cup $C^3$, and is ignited, and the burner C containing the wick $c^3$ is heated, thereby generating gas within the reservoir B, the pressure of which automatically feeds the same from said reservoir and through the tip $c^2$ within the burner tube C'. This gas is ignited, and is, by the burner tube C', directed against the pointed end $a$ of the soldering bolt A, and is caused by said pointed end to cling to the sides of the bolt A.

The frame D for supporting the soldering bolt A is secured by suitable fastening means $d$ to the burner tube C', and may be secured directly to said reservoir B if desired. This frame is provided with depending legs D' D' and with opposite arms $d'$ $d'$ having their outer ends hinged by a pin $d^2$ to the bolt A and having outwardly extending portions $d^3$ $d^3$ adjacent to the inner end of the soldering bolt.

The regulator E for governing the temperature of the soldering bolt consists of a ring hinged at $e$ to arms $C^5$ projecting from the outer end of the burner tube C', and said regulator is provided with a suitable hand engaging piece E'.

The operation of our invention will be readily understood upon reference to the drawings and the foregoing description, and it will be particularly noted that the same is easily operated, extremely efficient, independent of a heating furnace, and is consequently particularly applicable for work within tanks, upon roofs, in cornice making, &c.; that the soldering bolt may be readily shifted to the desired position, and is maintained at a uniform temperature; and that the flame is directed directly against the inner end of the soldering bolt, and is caused to follow the sides thereof, and is regulated at will by being deflected directly to, or more or less away from said soldering bolt by the regulator E.

As the detail construction and arrangement of our soldering tool may be considerably varied without departing from the spirit of our invention, we do not herein limit ourselves to the exact detail construction and arrangement thereof.

Having thus fully described our invention, what we claim as new, and desire to secure by Letters Patent, is—

1. In a soldering tool, the combination of a frame, a soldering bolt pivoted to said frame, and a fuel reservoir provided with a projecting burner rigidly secured thereto and extending toward the soldering bolt and having its outer end separated from the inner end of said bolt, substantially as and for the purpose described.

2. In a soldering tool, the combination of a frame, a soldering bolt pivoted to said frame, a fuel reservoir provided with a burner, and a burner tube of less diameter than the reservoir interposed between the reservoir and the soldering bolt, substantially as specified.

3. In a soldering tool, the combination of a frame, a soldering bolt pivoted to said frame, a fuel reservoir provided with a projecting burner secured thereto and extending toward the soldering bolt and having its outer end separated from the inner end of said bolt, and a burner tube projecting beyond the burner and provided with an air inlet in its side wall, substantially as set forth.

4. In a soldering tool, the combination of a soldering bolt, a fuel reservoir provided with a projecting burner secured thereto and extending toward the soldering bolt and having its outer end separated from the inner end of said bolt, and a burner cup arranged at one side of the burner for heating the same, substantially as and for the purpose set forth.

5. In a soldering tool, the combination of a soldering bolt, a fuel reservoir provided with a projecting burner secured thereto and extending toward the soldering bolt and having its outer end separated from the inner end of said bolt, a burner tube projecting beyond the burner, and a pivoted regulator supported on the burner tube in proximity to the soldering bolt, substantially as and for the purpose set forth.

6. In a soldering tool, the combination of a frame, a soldering bolt pivoted to said frame, a fuel reservoir provided with a burner, a burner tube having one end registered with the burner and the other end projecting beyond the same with its outer face separated from the inner end of the soldering bolt, substantially as and for the purpose specified.

7. In a soldering bolt, the combination of a soldering bolt, a fuel reservoir provided at one end with a handle and at its opposite end with a burner, a burner tube having one end registered with the burner and the other end projecting beyond the same with its outer face separated from the inner end of the soldering bolt, and a movable regulator mounted on the burner tube and movable between said soldering bolt and burner tube, substantially as and for the purpose described.

8. In a soldering tool, the combination of a soldering bolt, a fuel reservoir having an inlet opening in one end and provided at its opposite end with a projecting hollow burner secured thereto and extending toward the soldering bolt and having its outer end separated from the inner end of said bolt, a wick having one end supported within the burner and the other end projecting within the fuel reservoir and a handle projecting beyond said reservoir and having one end inserted in said inlet opening for closing the same and holding the handle in position, substantially as and for the purpose specified.

9. In a soldering tool, the combination of a soldering bolt, a fuel reservoir having a projecting hollow nipple provided with an outlet opening, a wick having one end arranged within the nipple and the other projecting within the reservoir, and a frame connecting the said soldering bolt and reservoir, substantially as and for the purpose described.

10. In a soldering tool, the combination of a fuel reservoir provided with a projecting burner, a frame secured to the reservoir and provided with separate arms, and a soldering bolt supported by the said arms, and provided with a pointed inner extremity normally aligned with said burner substantially as and for the purpose specified.

11. In a soldering tool, the combination of a fuel reservoir provided with a projecting burner, a frame secured to the reservoir and provided with separate arms, a soldering bolt supported by the said arms, and downwardly extending legs secured to the said frame, substantially as and for the purpose set forth.

12. In a soldering tool, the combination of a fuel reservoir provided with a burner, a soldering bolt, and a frame secured to said reservoir and having projecting arms hinged to the said soldering bolt and provided with outwardly extending portions adjacent to the inner end of the soldering bolt, substantially as and for the purpose described.

In testimony whereof we have hereunto signed our names, in the presence of two attesting witnesses, at Syracuse, in the county of Onondaga, in the State of New York, this 22d day of July, 1893.

DAVID G. ORR.
CLIFFORD E. THOMAS.

Witnesses:
CLARK H. NORTON,
E. A. WEISBURG.